United States Patent [19]
McKinnon

[11] Patent Number: 5,249,697
[45] Date of Patent: Oct. 5, 1993

[54] METER PIT

[76] Inventor: Robert M. McKinnon, P.O. Box 648, Bedford, Tex. 76021-0648

[21] Appl. No.: 885,193

[22] Filed: May 19, 1992

[51] Int. Cl.⁵ .............................................. B65D 25/24
[52] U.S. Cl. ..................................... 220/484; 220/354
[58] Field of Search ............... 220/484, 354, 3.3, 355, 220/356, 357, 352

[56] References Cited

U.S. PATENT DOCUMENTS

| | | | |
|---|---|---|---|
| 1,454,958 | 5/1923 | Davies | 220/354 |
| 1,568,625 | 1/1926 | Robinson | 220/354 |
| 4,247,013 | 1/1981 | O'Hori | 220/354 |
| 4,442,952 | 4/1984 | Patarini | 220/354 |
| 4,530,442 | 7/1985 | Vogel, Jr. et al. | 220/354 |
| 4,655,361 | 4/1987 | Clover et al. | 220/484 |
| 4,872,575 | 10/1989 | Kobilan | 220/484 |

*Primary Examiner*—Joseph Man-Fu Moy
*Attorney, Agent, or Firm*—Arthur F. Zobal

[57] ABSTRACT

A meter pit is formed by a container having a side wall extending 360 degrees around a central axis and having top and bottom edges at top and bottom ends respectively forming a chamber. A bottom central opening is formed at the bottom end for receiving a meter for location in the chamber. An upper wall extends radially inward 360 degrees from the top edge of the side wall with an upper central opening formed therethrough. The upper wall has an annular outer rim extending radially inward from the top edge to an annular groove and an annular inner rim extending from the groove to the upper central opening. The upper wall is employed to support a cover holder of the type having a circular outer edge with arcuate extensions or an arcuate extension extending downward from its bottom side for insertion into the annular groove. Cut out slots extend along the lower half of the side wall to facilitate entry of pipes into the chamber.

9 Claims, 2 Drawing Sheets

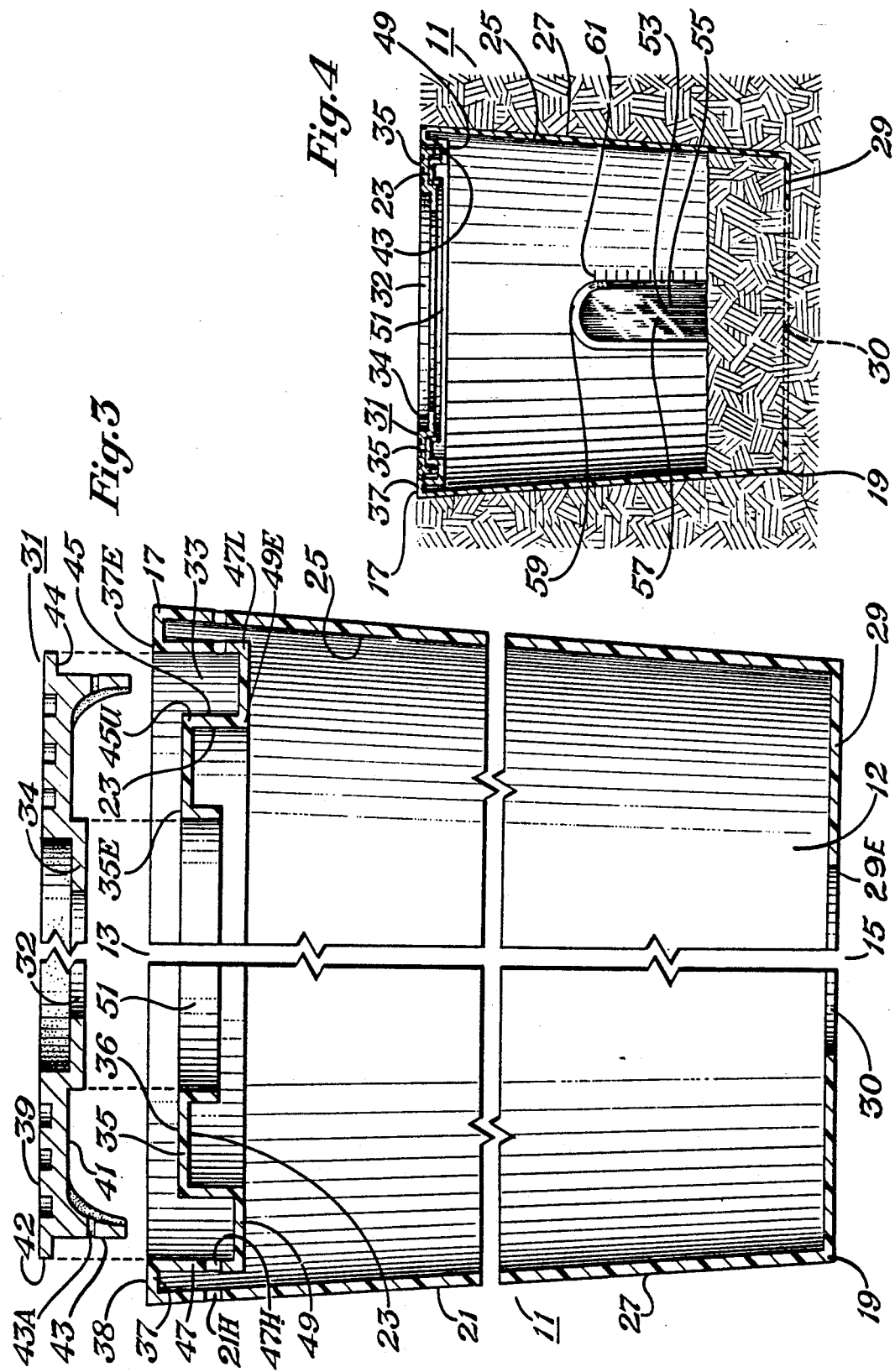

METER PIT

BACKGROUND OF THE INVENTION

1. Field of the Invention

The present invention relates to meter pits, in particular, water meter pits.

2. Description of the Prior Art

Water meter pits are used to protect and provide access to buried water meters. An underground water meter is installed by placing the water meter and connecting pipes in a trench, locating the meter pit around the water meter, and burying both the meter pit and the connecting pipes. The meter pit is buried up to its top edge and then a cover holder is attached. A removable cover fits into the cover holder. The cover may be removed to inspect the water meter.

A meter pit is usually a cylindrically shaped container constructed of corrugated metal or hard plastic. The meter pit has openings in both ends. The bottom end receives a water meter, and the top end receives a cover holder which receives a removable cover. The cover holder is a circular metal ring that has extension means projecting from the bottom surface of the cover holder for connecting the cover holder to the meter pit. A cover fits into a center circular opening in the cover holder ring. The extension means enable the cover holder to be fastened to the meter pit by screws, bolts, or rivets—the extension means having holes for receiving screws, etc. for attaching the cover holder to the meter pit.

Different types of cover holders are used on meter pits. The diameter of the cover holder, as well as the location, length, and radial thickness of the extension means, varies depending on the manufacturer of the cover holder. The cover holder may have an outer lip that rests on the top edge of a meter pit, or it may have no lip so that the cover holder fits inside of the upper edge of the meter pit with only the screws, etc. supporting the cover holder in place.

The water meter pit also must receive connecting pipes which connect to the water meter. In the prior art, holes or slots are cut in the bottom edges of the meter pit at the time of installation to accommodate the water pipes connecting to the water meter. Position and depth of the cut necessary to make an adequate slot is estimated by the installer since the meter pit has no guide markings. The water pipes fit into the holes when the meter pit is placed around the water meter.

SUMMARY OF THE INVENTION

The invention is directed to a hard plastic water meter pit which provides an effective means of supporting many types of meter pit cover holders of the type that receive a meter pit cover. The meter pit has a side wall, an upper wall, and top and bottom edges. The meter pit has a central axis around which the side wall extends 360 degrees circumferentially, forming a chamber within the side wall. The side wall extends between the top and bottom edges. The upper wall extends inward and around the top edge of the side wall with an upper central opening formed therethrough. The upper wall has inner and outer support rims and a groove located between the inner and outer support rims. Preferably the inner support rim is located below the outer rim. The upper wall of the meter pit will support a cover holder either by its outer rim, its groove or its inner rim thereby providing support for different types of cover holders.

The meter pit also has pipe slot guides which aid in cutting slots at the bottom of the water meter pit for accepting the water meter's connecting pipes. Guide slots are inset into the wall of the meter pit at the base of the pit. The guide slots show the installer where to cut holes to enable the meter pit to accommodate the water meter's connecting pipes. The guide slots have marks indicating the distance from the base of the meter pit which aid the installer in determining how much of the slot needs to be removed to accommodate connecting pipes located at varied depths. The guide slots and marks help to eliminate unnecessary guesswork when installing the meter pit.

BRIEF DESCRIPTION OF THE DRAWINGS

FIG. 3 is a longitudinal, partial, cross-sectional view of the meter pit receiving a cover holder along lines 3—3 of FIG. 2.

FIG. 4 is a longitudinal cross-sectional view of the meter pit as the pit would appear in the ground.

DESCRIPTION OF THE PREFERRED EMBODIMENT

Figure 1:
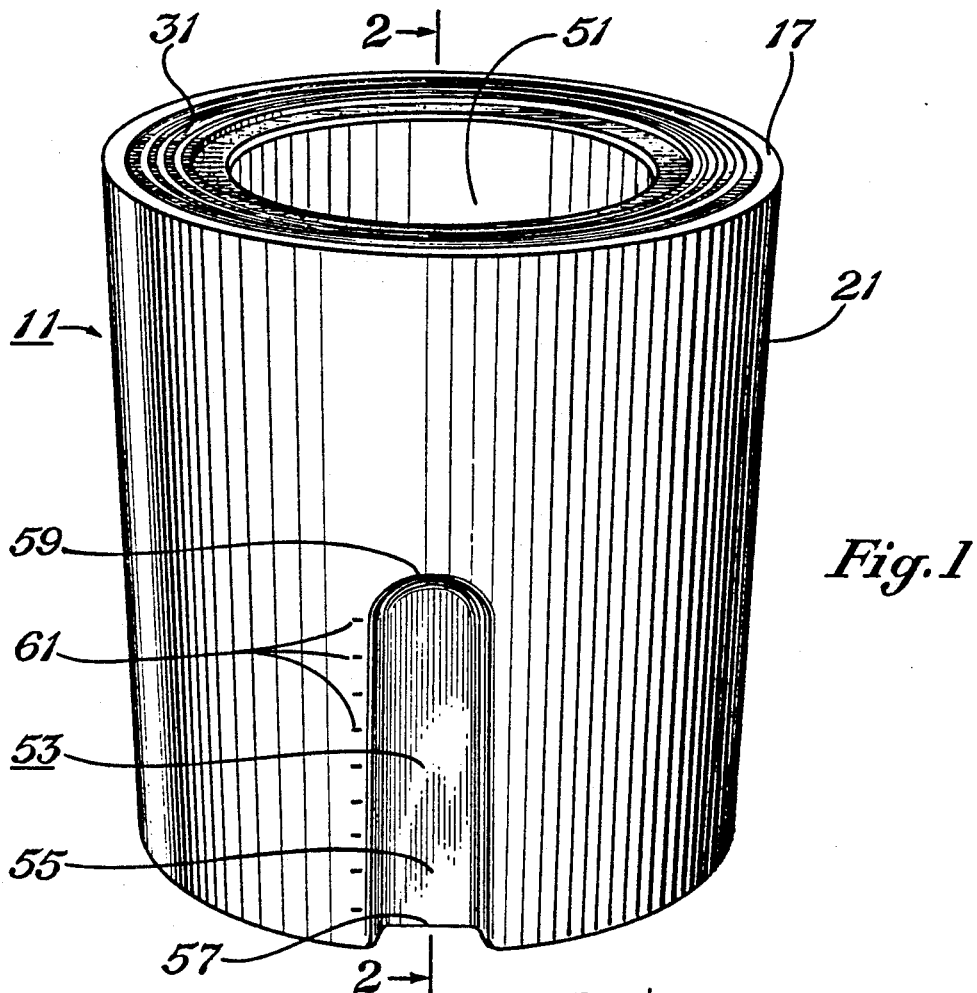
FIG. 1 is a perspective view of the meter pit with a cover holder on the meter pit.
Figure 2:
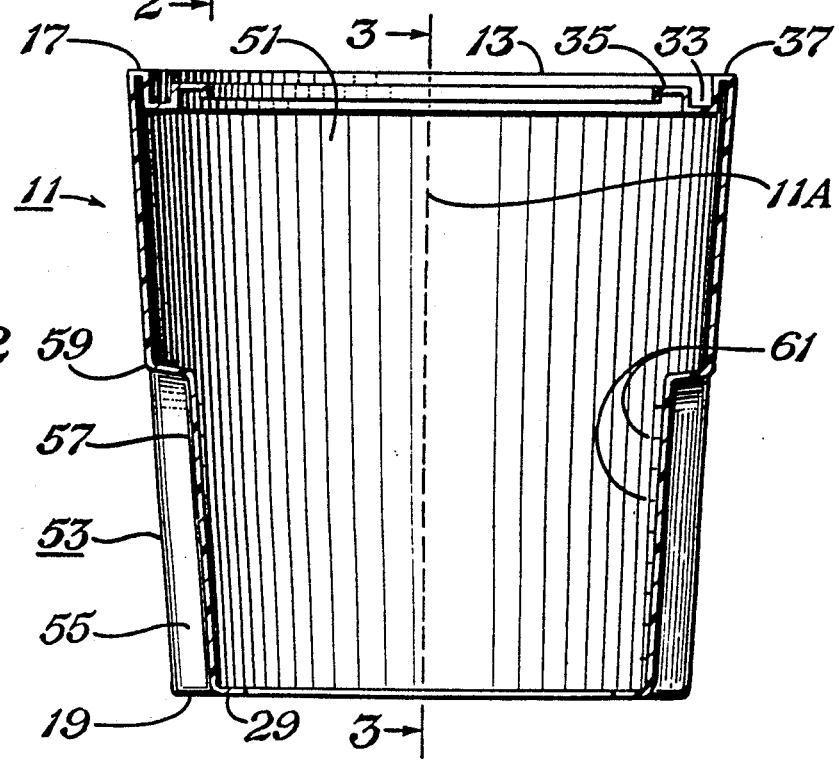
FIG. 2 is a longitudinal cross-sectional view of the meter pit taken through the pipe slots along lines 2—2 of FIG. 1.

Referring to FIGS. 1-3, a container 11 made of a hard plastic, such as polyethylene, has a top 13 and a bottom 15, with top and bottom edges 17, 19; an annular side wall 21; and a ring shaped upper wall 23. The side wall 21 has inner and outer surfaces 25, 27, and extends between the top and bottom edges 17, 19. The container 11 has a central axis 11A around which the side wall 21 extends 360 degrees circumferentially. The radius from the central axis 11A of the container 11 to the side wall 21 is greater at the top edge 17 of the container 11 than at the bottom edge 19, so that the general shape of the container 11 is that of a truncated cone. The container 11 is designed to receive a water meter within its chamber 12 through a bottom circular opening 30 of the container 11.

The container 11 is placed in the ground around a water meter, and is structured to prevent the container 11 from sinking further into the ground. A ring shaped lip 29 extends radially inward 360 degrees circumferentially from the side wall 21 at the bottom of the container 15, defining the bottom opening 30. The lip 29 does not extend so far radially inward from the side wall 21 of the container 11 so as to impede entry of the water meter into the chamber 12 of the container 11 by way of the opening 30, however, the lip 29 extends far enough inward to resist downward force which might cause the container 11 to sink or settle into the ground. In addition, the taper of the side wall 21 of the container 11 tends to keep the container 11 from sinking into the ground.

The container's upper wall 23 extends radially inward 360 degrees around the top edge 17 of the container 11 and receives a cover holder 31 for the container. The upper wall 23 has an annular groove 33 and annular inner and outer rims 35, 37 with outward facing support surfaces 36, 38, respectively. The upper wall 23 is configured so that the groove 33 extends between the annular inner and outer rims 35, 37. The annular outer rim 37 couples the upper wall 23 to the side wall 21 and extends radially inward to an inner edge 37E. The annular outer rim 37 extends transverse to the side wall 21 at the top edge 17 of the container 11. From the inner edge 37E of the outer rim 37 the upper wall 23 extends radially inward further, forming an annular groove 33. The groove 33 has inner and outer groove side walls 45, 47 and a groove floor 49. The groove side walls 45, 47 are circular in shape and extend transverse to the annular inner and outer rims 35, 37 towards the bottom of the container 15. The outer groove side wall 47 couples with the outer rim 37 at the inner edge 37E of the outer rim 37, extending downward to the lower end 47L of the outer groove side wall 47. The groove floor 49 couples with the outer groove side wall 47 at the lower end 47L of the outer groove side wall 47, extending radially inward to the inner edge 49E of the groove floor 49. The inner groove side wall 45 couples and extends upward from the inner edge 49E of the groove floor 49 to an upper end 45U of the inner groove side wall 45. The inner rim 35 couples the inner groove side wall 45 at the upper end 45U of the inner groove side wall 45 and extends radially inward to the inner end 35E of the inner rim, defining a circular central opening 51 of the container 11.

The upper wall is capable of receiving and supporting cover holders 31 of various designs, which in turn receive and support a meter pit cover (not shown). Conventional meter pit cover holders are manufactured in a variety of designs. Each cover holder has generally similar features: a ring shape, top and bottom surfaces 39, 41, an outer edge 42, and arcuate extension means 43 projecting from the bottom surface 41 of the cover holder 31 with apertures 43A for receiving screws, etc. for attaching the cover holder to the container. The diameters of individual cover holders 31 may differ, however. Some cover holders 31 have an annular outer lip 44 which is used to support the cover holder 31 on the top edge 17 of the container 11. Other cover holders (not shown) have their extension means flush with the outer edge, with an outer diameter smaller than the diameter of the container 11 at the top edge of the container 11 so that the cover holder fits within the container 11 at the top 13 of the container 11 and screws, etc. are used to attach and support the cover holder in place. Also the depth, radial width, and number of projections comprising the extension means 43 may vary depending on the type of cover holder 31. The cover holder 31 may have three or four spaced apart arcuate projections 43 located in a circle about the bottom surface 41 of the cover holder 31, or one continuous circular projection 43. All cover holders 31 have a central circular opening 32 defined by a ring shaped inner lip 34 which is used to receive and support a cover or lid. The cover may be locked in place by a key which inserts into a keyhole in the cover.

The upper wall 23 of the meter pit of the invention employs either the annular groove 33, the annular inner rim 35 or the annular outer rim 37 to receive and support different types of cover holders. The annular groove 33 will accept the extension means 43 of the cover holder 31. The groove floor 49 supports the extension means 43 of the cover holder 31 if the cover holder 31 has extension means 43 with sufficient length to reach the groove floor 49 when the cover holder 31 is in place on the container 11. The annular outer rim 37 will support the outer lip 44 of a cover holder if the cover holder has such an outer lip 44, and if the outer diameter of the cover holder 31 is slightly larger than the diameter across the inner edge 37E of the outer rim 37 of the container 11 at the top edge 17 of the container 11 and if the extensions 43 cannot reach the floor of the groove 33. If the cover holder has a lip 44 but an outer diameter smaller than the inside diameter of the outer groove wall 47 or if the cover holder 31 has no outer lip 44 and an outer diameter smaller than the inside diameter of the outer groove wall 47, the cover holder will fit inside of the outer groove wall 47 and be supported either by the groove floor 49 if its extension means 43 is long enough or by the inner rim 35.

When the cover holder 31 is supported by the upper wall 23, the cover holder 31 is secured in place by screwing, bolting, or riveting the extension means 43 to the container 11 to prevent the cover holder 31 from being removed by someone intending to tamper with a water meter contained with the chamber 12 of the container 11. Bolt holes 21H and 47H are formed in the side wall 21 and the outer groove side wall 47 corresponding to holes 43A extending through the extension means 43. Bolts, rivets or screws are subsequently used to secure the extension means 43 to the container 11 by way of the holes 21H, 47H and 43A in the side wall 21, outer groove side wall 47 and the extension means 43.

In the preferred embodiment, the container has two guide slots 53, that are two insets 55 with removable recessed surfaces 57 that allow the container 11 to receive water pipes that connect to a water meter that has been received by the container 11. The insets 55 extend from the bottom edge 19 of the container 11 towards the top edge 17 of the container 11 along the side wall 21 of the container 11. The insets 55 are diametrically opposed with respect to the bottom 15 and side wall 21 of the container 11. The insets 55 each have an arched shape with the apex of the arch 59 located nearest the top edge 17 of the container 11. Each inset 55 forms a depression in the outer surface 27 of the side wall 21 and causes the inner surface 25 of the side wall 21 to bulge radially inward, however, the insets 55 only extend partway into the lip 29 at the bottom edge 19 of the container 11. Each recessed surface 57 extends from the bottom edge 19 of the container 11 to the apex of the inset 59 Each recessed surface 57 also extends across the width of the inset 55. The recessed surfaces 57 are removable with a knife or saw so that the insets 55 may receive water pipe. The side wall 21 near the insets 55 has markings 61 for identifying different levels in inches from the bottom to enable one to easily determine the height of the inset from the bottom edge 19 to be removed to enable the inset 55 to receive an installed water pipe. Removal of the recessed surface 57 is accomplished by sawing the recessed surface 57 out using a hacksaw or similar tool.

In one embodiment of the invention, the container 11 stands 18¼ inches tall from the bottom edge 19 to the top edge 17 of the side wall 21. The container 11 has the general shape of a truncated cone to keep the container 11 from sinking into the ground. The container 11 measures 18½ inches across the diameter of the top edge 17 and 17 inches across the diameter of the bottom edge 19 from outer surface 27 to outer surface 27 of the side wall 21. The side wall 21 has a thickness of ⅜ of an inch. The diameter across the top edge 17 from the inner surface 25 is 17¾ inches. The lip 29 at the bottom 15 of the container 11 also keeps the container 11 from sinking in the ground. The lip 29 extends 2½ inches radially inward from the outer surface 27 of the side wall 21, and the diameter across the lip 29 from inner edge 29E to inner edge 29E of the lip 29 is 12 inches.

The upper wall 23 of the container 11 receives the cover holder 31 with extension means 43. For example, the upper wall 23 can receive and support a metal cover holder 31 having a diameter measuring 17½ inches from outer edge 42 to outer edge 42. In one embodiment, four evenly spaced apart extension means 43 extend 1 inch down from the bottom 41 of the cover holder 31, and are set ¼ inch in from the outer edge 42 of the cover holder 31. The arcuate extensions 43, each have an outside circumference of about 3 inches and a width of ⅜ inch. They extend around the edge of the circular cover holder plate 42; spaced inwardly from the outer edge 42 about ¼ of an inch. The outer edge 42 of the cover holder 31 rests on the annular outer rim 37 of the upper wall 23. In FIGS. 3 and 4, the outside diameter of the cover holder 31 is less than the inside diameter of groove walls 47, therefore, the inner rim 35 will support the cover holder 31. The outer rim 37 has an outside width of ¼ inch, and the inside diameter across the outer rim 37 from inner edge 37E to inner edge 37E measures 17¼ inches. The groove 33 of the upper wall 23 accepts the arcuate extensions 43. The groove 33 is ⅜ inch wide, and is 1¼ inches deep when measured from the outer rim 37 and ⅞ of an inch deep when measured from the inner rim 35. The inner rim 35 has a width of 1 inch and is recessed ⅜ of an inch with respect to the top edge 17 of the container 11. Overall, the upper wall 23 extends 2⅛ inches radially inward from the inner surface 25 of the side wall 21.

The insets 55 in the outer surface 27 of the side wall 21 of the container 11 are designed to be cut out so the container 11 may receive water pipes. The insets 55 extend 12 inches from the bottom edge 19 of the container 11 to the apex 59 of the guide slots 53, and have a width of 3¼ inches along the bottom edge 19 of the container 11. The recessed surface 57 extends radially inward 1¼ inches from the outer surface 27 of the side wall 21.

The container 11 may be made of polyethylene, cross-liked polyethylene, or other rigid strong plastics. Preferably, the plastic is formed into the shape of the container 11 by a rotational molding process.

The description of the container 11 is not intended to be limiting, and should not be construed as such. For example, the container 11 may have dimensions different from these described. Various other modifications can be made within the scope of the invention, which is defined by the following claims:

I claim:

1. An apparatus for containing a meter comprising:
a container having a side wall extending 360 degrees around a central axis and having top and bottom edges at top and bottom ends respectively forming a chamber,
a bottom central opening formed at said bottom end for receiving a meter for location in said chamber,
an upper wall extending inward 360 degrees from said top edge of said side wall with an upper central opening formed therethrough,
said upper wall having an annular outer rim extending radially inward from said top edge of said side wall to an inner edge; an annular groove formed by an outer groove side wall extending downward from said inner edge of said outer rim to a lower end, a groove floor wall extending radially inward from said lower end of said outer groove side wall to an inner edge, and an inner groove side wall extending upward from said inner edge of said groove floor wall to an upper end; and an annular inner rim located at a level below that of said annular outer rim relative to said bottom end and extending radially inward from said upper end of said inner groove side wall to said upper central opening,
said upper wall being employed to support a cover holder of the type having a circular outer edge and a bottom surface with extension means projecting downward from the bottom surface for insertion into said annular groove of said upper wall.

2. The apparatus of claim 1, wherein:
said side wall and said upper wall are molded from a plastic material as a single member.

3. The apparatus of claim 2, wherein:
said annular outer rim has an upper surface which is substantially flat.

4. The apparatus of claim 3, wherein:
said annular inner rim has an upper surface which is substantially flat.

5. An apparatus for containing a meter comprising:
a container having a side wall extending 360 degrees around a central axis and having top and bottom edges at top and bottom ends respectively forming a chamber,
a bottom central opening formed at said bottom end for receiving a meter for location in said chamber,
an upper wall extending inward 360 degrees from said top edge of said side wall with an upper central opening formed therethrough,
said upper wall having an annular outer rim extending radially inward from said top edge of said side wall to an inner edge; an annular groove formed by an outer groove side wall extending downward from said inner edge of said outer rim to a lower end, a groove floor wall extending radially inward from said lower end of said outer groove side wall to an inner edge, and an inner groove side wall extending upward from said inner edge of said groove floor wall to an upper end; and an annular inner rim extending radially inward from said upper end of said inner groove side wall to said upper central opening,
said upper wall being employed to support a cover holder of the type having a circular outer edge and a bottom surface with extension means projecting downward from the bottom surface for insertion into said annular groove of said upper wall,
said bottom edge has a lip that extends radially inward from said side wall of said container to said bottom central opening, to prevent said container from sinking in the ground.

6. The apparatus of claim 5, wherein:
said side wall has a greater outside diameter at said top edge than at said bottom edge defining a truncated cone to prevent said container from sinking in the ground.

7. An apparatus for containing a meter comprising:
a container having a side wall extending 360 degrees around a central axis and having top and bottom edges at top and bottom ends respectively forming a chamber,
a bottom central opening formed at said bottom end for receiving a meter for location in said chamber, an upper wall extending inward 360 degrees from said top edge of said side wall with an upper central opening formed therethrough, said upper wall having an annular outer rim extending radially inward from said top edge of said side wall to an inner edge; an annular groove formed by an outer groove side wall extending downward from said inner edge of said outer rim to a lower end, a groove floor wall extending radially inward from said lower end of said outer groove side wall to an inner edge, and an inner groove side wall extending upward from said inner edge of said groove floor wall to an upper end; and an annular inner rim extending radially inward from said upper end of said inner groove side wall to said upper central opening, said upper wall being employed to support a cover holder of the type having a circular outer edge and a bottom surface with extension means projecting downward from the bottom surface for insertion into said annular groove of said upper wall, said side wall and said upper wall are molded from a plastic material as a single member, said bottom edge has a lip that extends radially inward from said side wall of said container to said bottom central opening, to prevent said container from sinking in the ground.

8. The apparatus of claim 7, wherein:
said side wall has a greater outside diameter at said top edge than at said bottom edge defining a truncated cone to prevent said container from sinking in the ground.

9. An apparatus for containing a meter comprising:
a container having a side wall extending 360 degrees around a central axis and having top and bottom edges at top and bottom ends respectively forming a chamber, a bottom central opening formed at said bottom end for receiving a meter for location in said chamber, an upper wall extending inward 360 degrees from said top edge of said side wall with an upper central opening formed therethrough,.

said upper wall having an annular outer rim extending radially inward from said top edge of said side wall to an inner edge; an annular groove formed by an outer groove side wall extending downward from said inner edge of said outer rim to a lower end, a groove floor wall extending radially inward from said lower end of said outer groove side wall to an inner edge, and an inner groove side wall extending upward from said inner edge of said groove floor wall to an upper end; and an annular inner rim extending radially inward from said upper end of said inner groove side wall to said upper central opening, said upper wall being employed to support a cover holder of the type having a circular outer edge and a bottom surface with extension means projecting downward from the bottom surface for insertion into said annular groove of said upper wall, said container has pipe slot means for use for extending pipe through said container to a meter located within said chamber of said container, said pipe slot means comprising:

two insets located on opposite sides of said side wall with each inset having a recessed surface, said insets extending from said bottom edge of said container towards said top edge of said container, each said recessed surface of each of said insets being removable so that each inset is capable of accepting pipe therethrough.

* * * * *